March 7, 1967 J. J. BOURDON ETAL 3,308,450

MAGNETIC TRANSDUCER HEAD ASSEMBLY WITH SPRING BIASING HEAD ASSEMBLY AWAY FROM DRUM

Filed Sept. 30, 1963 4 Sheets-Sheet 1

INVENTORS
JOSEPH J. BOURDON, ALEX NAMETH,
DONN F. MOORE, MERTON L. RIPLEY,
JOHN STENCEL JR. & LLOYD S. QUICK.

BY Bower & Patalidis
ATTORNEYS

INVENTORS
JOSEPH J. BOURDON, ALEX NAMETH,
DONN F. MOORE, MERTON L. RIPLEY,
JOHN STENCEL JR. & LLOYD S. QUICK
BY Bower & Patalidis
ATTORNEYS INVENTORS
JOSEPH J. BOURDON, ALEX NAMETH,
DONN F. MOORE, MERTON L. RIPLEY,
JOHN STENCEL JR. & LLOYD S. QUICK.
BY Bower & Patalidis
ATTORNEYS INVENTORS
JOSEPH J. BOURDON, ALEX NAMETH,
DONN F. MOORE, MERTON L. RIPLEY,
JOHN STENCEL JR. & LLOYD S. QUICK
BY Bower & Patalidis
ATTORNEYS United States Patent Office 3,308,450
Patented Mar. 7, 1967

3,308,450

MAGNETIC TRANSDUCER HEAD ASSEMBLY WITH SPRING BIASING HEAD ASSEMBLY AWAY FROM DRUM

Joseph J. Bourdon, Birmingham, Alex Nameth, Dearborn, Donn F. Moore, Detroit, Merton L. Ripley, Milford, John Stencel, Jr., Bloomfield Hills, and Lloyd S. Quick, Pontiac, Mich., assignors to Ex-Cell-O Corporation, Detroit, Mich.

Filed Sept. 30, 1963, Ser. No. 312,583
10 Claims. (Cl. 340—174.1)

The present invention relates in general to new and improved electromagnetic transducer head assemblies, and more particularly to means of mounting electromagnetic transducer heads in close proximity to, but out of contact with, a magnetizable record surface.

In magnetic data storage devices of the type having a rapidly moving record body with a magnetizable surface thereon and at least one transducer head disposed in close juxtaposition thereto, it is essentially to maintain between the flux emitting pole pieces of the transducer head and the record surface a constant and uniform narrow spacing or air gap which is necessary in order to obtain substantially strong signals on the record surface and strong playback signals from the transducer head while preventing damage to the recording medium, the transducer head, or both, which would result from erratic or sustained contact between those components.

This spacing or air gap is critical in nature and must be precisely adjusted to maintain uniformity in recording and playback from one electromagnetic transducer head to another and it must remain constant for every given transducer head over a long period of time in order to provide uniform and stable recording and playback levels. Runout, wobble, thermal expansion and vibration of the support of the moving record surface destroy any attempt at recording high density magnetic data bits where electromagnetic transducer heads are fixedly mounted in such away that they are prevented from following the irregularities of the record surface. Thermally induced radial expansion, added to centrifugal growth of the record medium, further complicates the problem when magnetic recording devices of the drum type are caused to rotate at relatively high speeds.

The present invention provides a novel, simple and inexpensive solution to those problems by providing an electromagnetic transducer head capable of being supported by the fluid bearing developed by a rapidly moving record surface. The electromagnetic transducer head is resiliently secured to an adjustable mounting bracket and is encased in a light pad or shoe with the accompanying result of low mass and inertia enabling the transducer head to follow faithfully and accurately the wobble or runout of the record surface, maintaining a constant spacing therewith without induced oscillations.

The present invention has particular applications for incorporation into magnetic data storage apparatus of the drum and disc types, such as are described and claimed in applications Ser. Nos. 199,422 and 231,356 filed, respectively, on June 1, 1962, and October 18, 1962, in the name of George D. Cheney and assigned to the same assignee as the present invention, now U.S. Patents Nos. 3,259,889 and 3,196,422. The apparatus described in the aforementioned applications comprise a tapered drum or a disc member having a record surface thereon which is positioned away from the transducer heads during start and stop of the apparatus. When the record medium has accelerated to a velocity sufficient to develop an air or gas bearing induced by the laminar flow of air or gas set in motion by the rapidly moving record medium, the record medium is automatically moved to a position of close proximity to the transducer heads. By using transducer head assemblies according to the teachings of the present invention, the transducer heads are borne by the air or gas bearing thus developed, in close proximity to the record medium without the risk of any damage due to contact therewith. During start or stop, when the flow of air or gas is insufficient to provide a bearing strong enough to support the transducer heads, the record surface is maintained at a safe distance from the transducer heads.

It is therefore an object of this invention to provide a device for resiliently supporting one or more transducer heads a predetermined short distance away from a moving record surface utilizing the bearing action of the fluid flow caused by the motion of the record surface.

It is another object of this invention to provide an electromagnetic transducer head encased in a molded pad or shoe having a bearing surface capable of being supported by a fluid bearing.

It is a further object of this invention to provide resilient mounting means for fluid bearing supported electromagnetic transducer heads affording a predetermined degree of freedom of motion in one direction only, thereby maintaining at all times the magnetic gap properly oriented and the axis of said gap substantially normal to the record surface.

It is still another object of the invention to provide a mounting means for fluid bearing supported electromagnetic transducer head which is adjustable only in a direction parallel to the axis of the electromagnetic transducer head magnetic gap, in order to assure proper dynamic operation of the fluid bearing supported transducer head, with optimum record and playback characteristics and with a minimum of variations of said characteristics between the several transducer heads incorporated in a given system.

Another object of this invention is to provide a mounting for electromagnetic transducer head including a biasing means for urging the transducer head away from the record surface in the event of failure of the fastening means.

It is yet another object of this invention to provide a simple and precise adjustment means for adjusting the spacing between a fluid bearing supported transducer head and a record surface during the dynamic operation of the apparatus including said transducer head.

It is still a further object of this invention to provide a structure capable of accomplishing the above objects with a minimum of material cost and fabricating expense, and at the same time being composed of simple and ruggedly constructed elements which are substtntially safe and trouble-free in operation.

Other objects and advantages of the invention will be more readily appreciated by reference to the following description taken in connection with the accompanying drawings, in which like numerals refer to like elements, and wherein:

FIGURE 5 is a side elevation view of the device of

Figure 4:
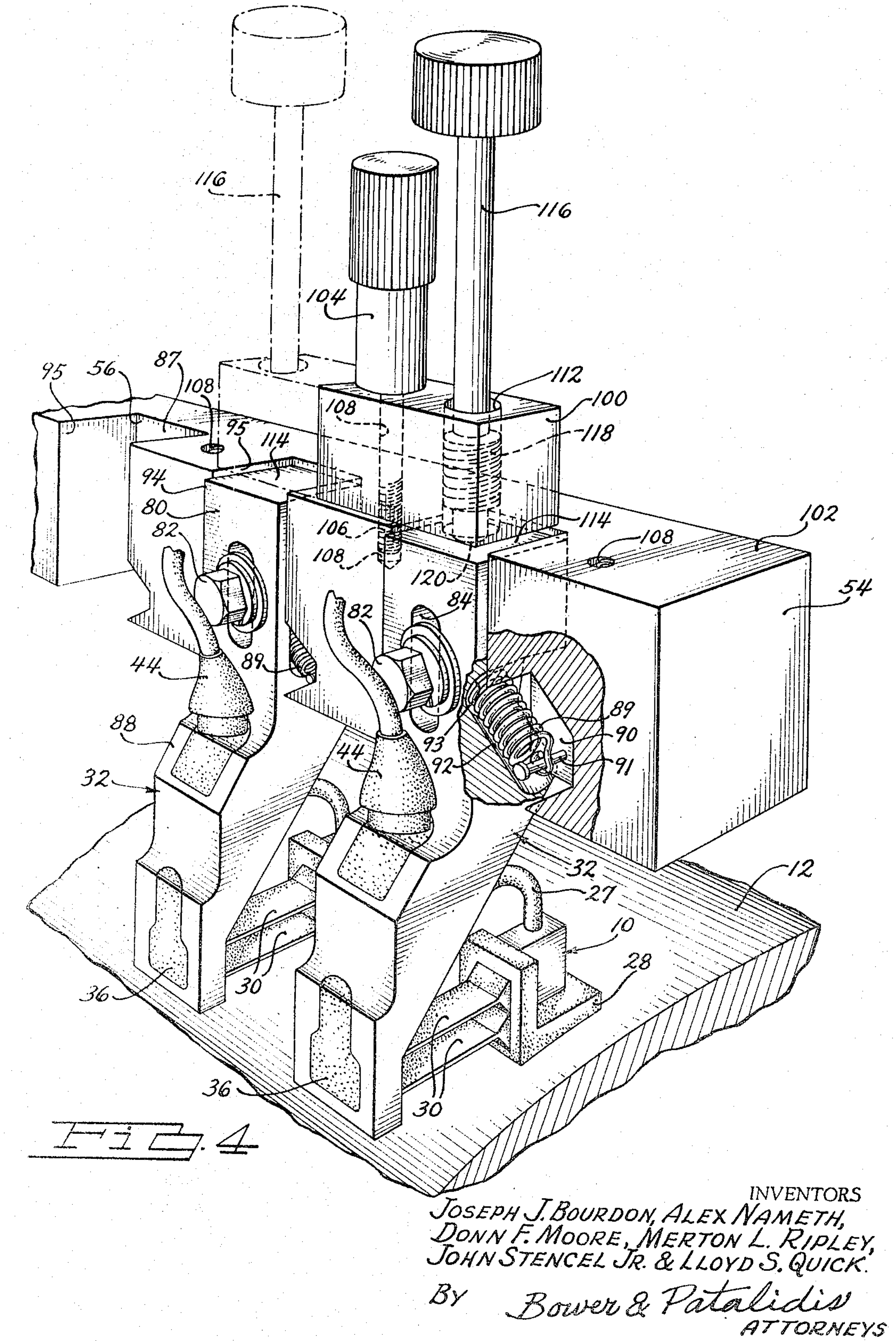
FIGURE 4 represents a perspective view of an example of an alternate structural embodiment according to the invention, with portions broken away for the sake of clarity.
Figures 5, 6:
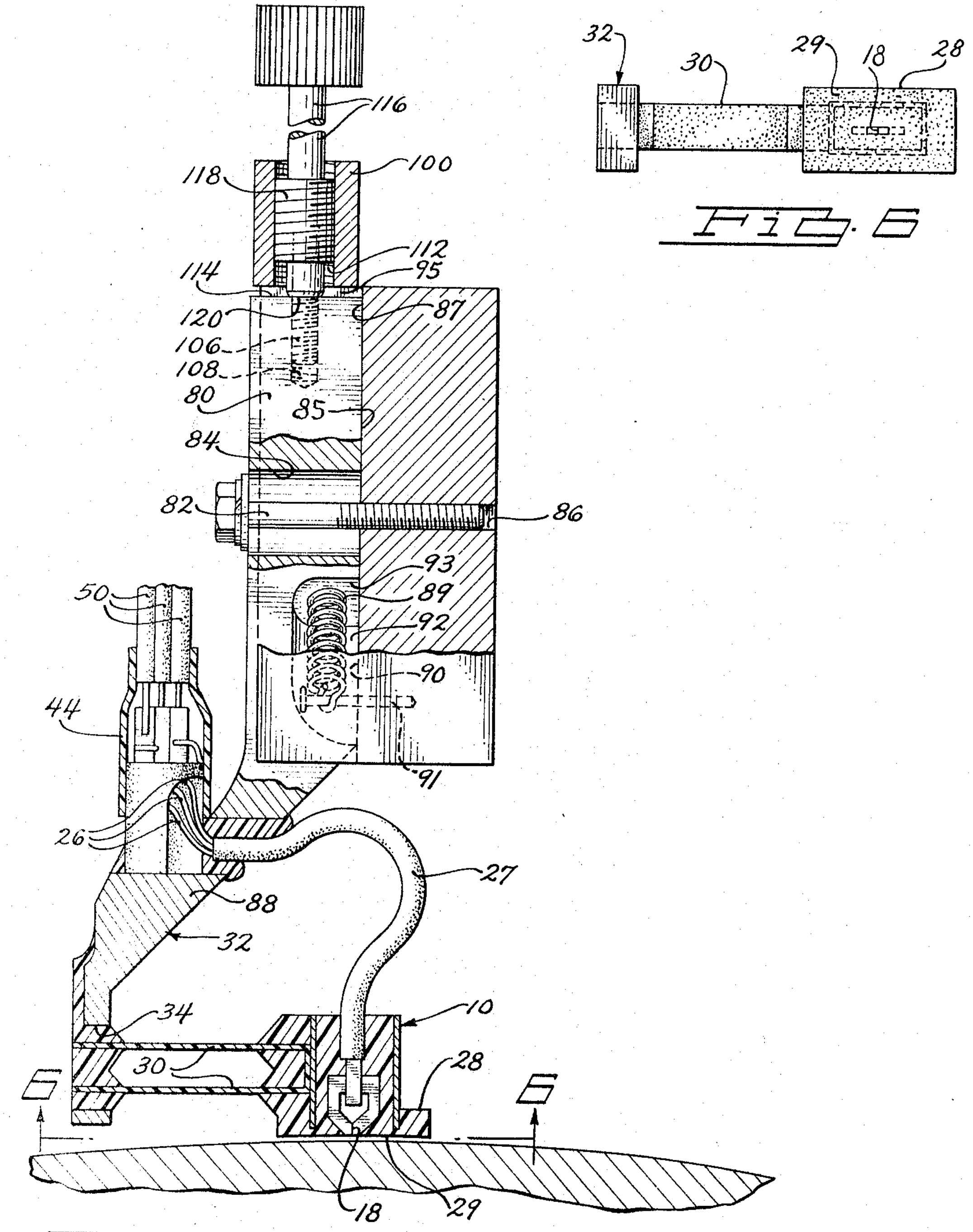

FIGURE 4, partially in section to show the internal construction and the relationship between elements; and FIGURE 6 is a bottom plan view of the device as seen from line 6—6 of FIGURE 5.

Figure 1:
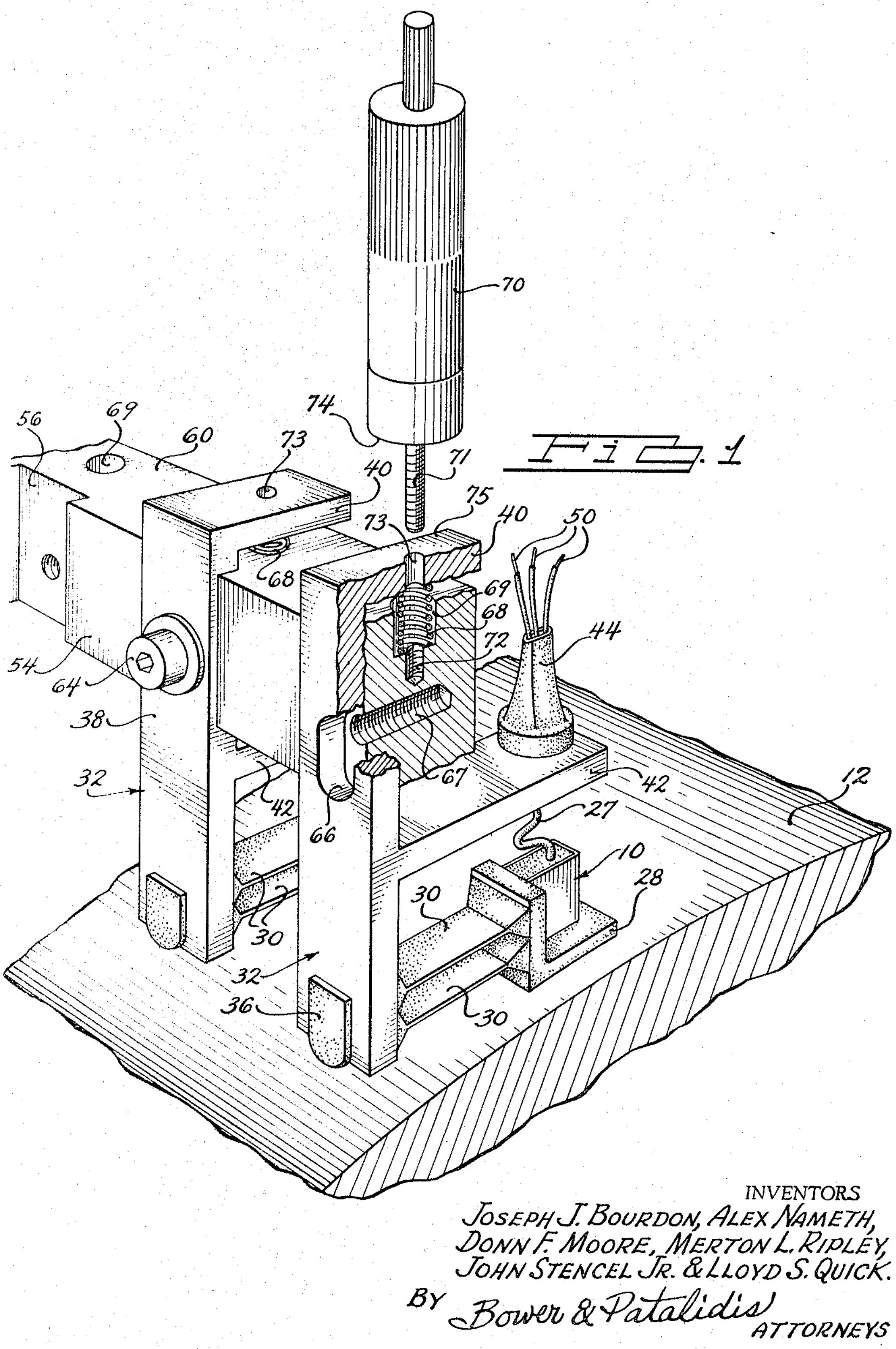
FIGURE 1 represents a perspective view of an example of a structural embodiment according to the present invention, with portions broken away for the sake of clarity.
Figures 2, 3:
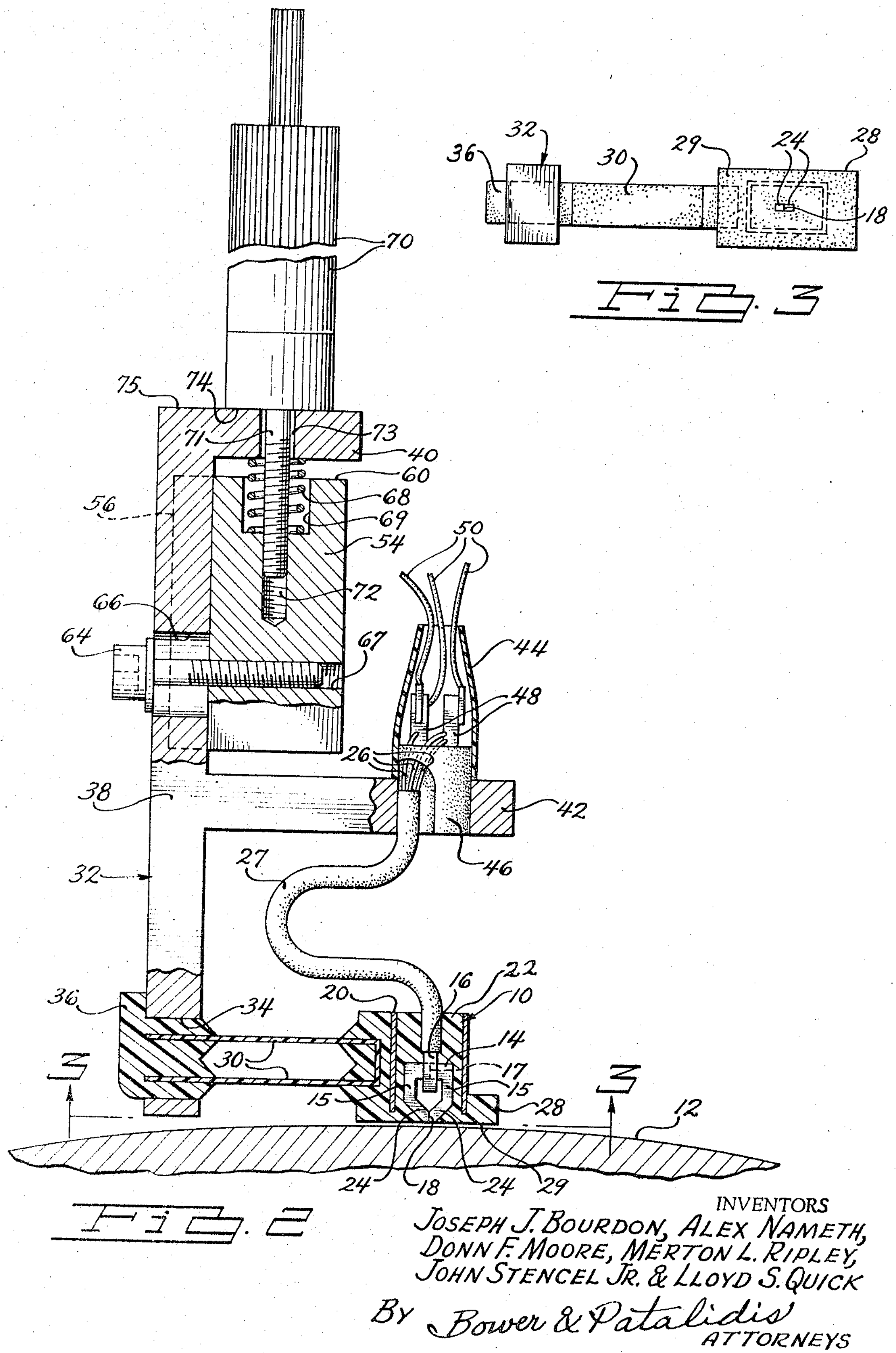
FIGURE 2 is a side elevation view of the device of FIGURE 1, partially in section to show the internal construction thereof.
FIGURE 3 is a bottom plan view of the device as seen from line 3—3 of FIGURE 2.

Referring now to the drawings and more particularly to FIGURES 1 through 3 thereof, an electromagnetic transducer head 10 is adapted to be normally disposed proximate to a record surface 12 in such a manner as to be supported thereaway by the fluid bearing developed by the moving record surface 12.

As best shown in FIGURE 2, the electromagnetic transducer head 10 comprises a magnetic core 14 made of two substantially C-shaped symmetrical half-cores 15—15 of magnetic material such as ferrite or the like disposed with a first pair of ends abutting to form a back-gap junction 17 and a second pair of ends, or pole pieces, 24—24 separated by a magnetic flux deflecting sliver or gap spacer 18. A coil 16 is wound around the back gap junction 17 and is provided with terminal wires 26 enclosed in a protective sleeve 27.

The core-coil sub-assembly is surrounded by a magnetic shielding 20 and the entire assembly is supported by being partially embedded in a molded pad or shoe 28. The pad or shoe 28 is preferably cast in form with an epoxy-type potting compound 22 which is also allowed to fill the space between the shielding 20 and the other components of the head assembly. The pad or shoe 28 is provided with a smooth bearing surface 29 confronting the record surface 12, and the pad or shoe is molded in such a manner as to hold the pole pieces 24–24 and the gap spacer 18 of the electromagnetic transducer head disposed substantially flush with the bearing surface 29. An example of material particularly well-suited for casting the pad or shoe 28 and for use as a potting compound and filler for the electromagnetic transducer head is Stycast 2651, Stycast being a trademark of the Emerson and Cummings Co.

The pad or shoe 28 is supported from a substantially F-shaped support bracket 32 by a pair of flat resilient reed members 30—30 disposed in parallel planes, one above the other, substantially perpendicular to the axis of the electromagnetic transducer head magnetic gap. The reed members 30—30 are preferably made of a single piece of material, metal or plastic, bent over as shown in FIGURE 2, or, alternately, they could be made of separate pieces. One end of each reed member 30 is affixed to the electromagnetic transducer head pad or shoe 28 by being imbedded in the pad or shoe material. The other end of each reed member 30 is attached to the F-shaped mounting bracket 32 by being inserted in an aperture 34 and affixed therein with a bonding and potting compound 36 which may be the same material as the pad or shoe material. The reed members 30—30 may be made of spring steel, spring bronze, stainless steel, Mylar which is a trademark of E. I. du Pont de Nemours and Co., and the like.

The body portion 38 of the F-shaped mounting bracket 32 is disposed along a plane substantially perpendicular to the reed members 30—30. Disposed at the end of the body portion 38 of the mounting bracket 32 farthest from the reed members 30—30 there is an integral flange portion 40 substantially at right angle with the body portion 38 of the mounting bracket 32 and, consequently, substantially parallel with the reed members 30—30. A connector support arm member 42 is affixed to, or made integral with the body 38 of the mounting bracket 32 and has for sole function a convenient binding post, or connector, 44 for the terminal wires 26 of the electromagnetic transducer coil, the binding post or connector 44 being attached to the support arm member 42 by way, for example, of a bonding material 46, or by any other convenient means, and being provided with lugs 48 to which electric wires 50 are removably clamped by means, for example, of spring clips for the purpose of connecting the electromagnetic transducer coil to the appropriate read and write amplifiers and erase oscillators (not shown).

A plurality of electromagnetic transducer head mounting brackets 32 are normally attached to a mounting bar 54 disposed in a fixed spatial arrangement relative to the record surface 12, the mounting bar 54 being in turn mounted upon the shroud or housing, not shown, of the recording apparatus.

Each mounting bracket 32 fits snugly but slidably into a slot 56 in the mounting bar 54, this disposition thus providing predetermined and substantially precise alignment of the electromagnetic transducer head bracket 32 and restricting it to a unidirectional adjustment movement, parallelly to the gap axis of the transducer head 10. The transducer mounting bracket 32 is attached to the mounting bar 54 by being disposed in the slot 56 such that the flange 40 of the bracket overlaps a surface 60 of the mounting bar 54. An elongated mounting hole 66 is provided through the body 38 of the mounting bracket 32 to afford a passage for a mounting screw 64 adapted to engage a tapped hole 67 in the mounting bar 54. A coil spring 68 disposed in a recess 69 in the mounting bar 54 exerts a force on the flange 40 of the mounting bracket 32 in a direction that normally urges the mounting bracket, and consequently the electromagnetic transducer head 10, away from the record surface.

In order to establish the proper gap spacing between the pole pieces of the electromagnetic transducer heads and the record surface 12, all the transducer heads are first assembled by fastening the mounting brackets upon the mounting bars, as illustrated in FIGURES 1 and 2, in such a way that the coil springs 68 are substantially fully extended so as to position the bearing surfaces 29 of the transducer pads or shoes 28 a safe distance away from the record surface 12. In data storage apparatus utilizing a cylindrical drum with a magnetizable record surface thereon, the drum is started and allowed to run for a period of time sufficient to insure that centrifugal growth and thermal expansion of the drum have reached steady-state equilibrium and that the drum is spinning at normal operational velocity. Where the electromagnetic transducer head assemblies of the invention are used in combination with a tapered drum or a disc adapted to be axially movable in the manner explained in the aforementioned patent applications, the drum or disc is allowed to assume its normal running position and to reach its centrifugal and thermal growths steady-state quilibrium. Each electromagnetic transducer head is then individually adjusted in the following manner:

The mounting screw 64 is loosened and the threaded portion 71 of a vernier adjusting tool 70 is inserted through an access hole 73 disposed through the flange portion 40 of the mounting bracket. The threaded portion 71 of the vernier adjusting tool 70 extends through the coil spring 68 and engages a threaded bore 72 in the mounting bar 54. Turning the vernier adjusting tool in the appropriate direction causes its shoulder portion 74 to engage surface 75 of the flange portion 40, thereby linearly displacing the mounting bracket 32 slidably within slot 56 of the mounting bar 54 in a direction that causes the bearing surface 29 of the transducer head pad or shoe 28 to be urged closer to the recording surface 12, at the same time compressing the coil spring 68. Information, for example according to a test pattern, is continuously recorded by the transducer head upon the record surface 12 and the level of recorded signals is monitored by switching the transducer head to its playback mode and observing the signal waveform trace on the screen of an oscilloscope, or measuring the playback voltage across the transducer head wire terminals, or by any other convenient means. When a proper level of signals is obtained, the mounting screw 64 is secured, and the vernier adjusting tool 70 is removed.

The gap spacing between the transducer head pole pieces of each transducer head and the record surface is individually adjusted so as to provide an optimum signal level practically constant from head to head, the transducer heads being borne at all times by the laminar film of air or gas developed by the rapidly moving record surface under the bearing surface 29 of the pad or shoe 28. It is evident that when the vernier adjusting tool 70 is rotated in an opposite direction with the mounting screw 64 loosened, the coil spring 68 expands and urges the flange portion 40 of the mounting bracket 32 away from the surface 60 of the mounting bar 54, with the result that the mounting bracket is slidably and linearly displaced in the direction that increases the distance separating the bearing surface 29 of the pad or shoe 28 from the record surface 12. Furthermore, the coil spring 68 provides a convenient fail safe device which insures that, in the event that the mounting screw 64 becomes accidentally loose at any time during operation of the data storage device, the transducer head will be urged away from the recording surface.

Once all the transducer heads have been properly adjusted, the record member may be stopped. In applications where the data storage apparatus is of the type described in the aforementioned patent applications, the record surface is automatically retracted to a safe distance away from the transducer head pads or shoes as soon as the record surface velocity drops below a predetermined value. In applications where the record surface is upon the periphery of a conventional drum, the gap or spacing between the record surface and the bearing surface of the pads or shoes is adjusted, while the drum is spinning, to a distance that will preferably insure that the bearing surface does not engage the record surface when the drum is slowed to a velocity insufficient to develop a laminar film of air or gas strong enough to support the transducer head. When the drum is slowing down, the centrifugal force decreases and the drum contracts. However the variations in the drum diameter between the static and dynamic states is relatively small with the accompanying result that the gap spacing during normal operating conditions is compartively larger than when the transducer heads according to the invention are used in combination with the apparatus of the types described in the aforementioned patent applications.

It is also apparent that once the proper gap or spacing has been established between the bearing surface 29 of the pad or shoe 28 and the record surface 12, the pad or shoe is supported during operation of the apparatus by a fluid bearing and is capable of following all the irregularities of the record surface by virtue of the resilient and yielding connection with support bracket 32 afforded by the reed members 30—30, although the magnetic gap axis of the transducer head is maintained perfectly aligned as a consequence of the considerably greater lateral stiffness of the reed members.

Referring now to FIGURES 4 through 6, which represent an alternate embodiment of the present invention, an electromagnetic tranducer head 10 is mounted in a molded pad or shoe 28 proximate to a record surface 12 and, in a manner similar to what was described in relation to the example of the invention of FIGURES 1–3, the molded pad or shoe 28 is supported by resilient reeds 30 away from the end of a mounting bracket 32. A mounting bar 54 is provided in a fixed spatial relationship with the record surface 12 and is adapted to accommodate a plurality of electromagnetic transducer head mounting brackets 32.

Each transducer head mounting bracket 32 is attached to the mounting bar 54 by inserting the body 80 of the mounting bracket 32 into a slot 56 in the mounting bar and by being secured thereto by means of a mounting screw 82 passing through an elongated mounting hole 84 in the body 80 of the mounting bracket 32 and engaging a threaded hole 86 provided in the mounting bar 54, so that the reference surface 85 of the mounting bracket is applied to the reference bottom surface 87 of the slot 56.

The mounting bracket 32 has an integral offset portion 88 at the end of which are secured the reed members 30—30 resiliently supporting the transducer head 10 so that the magnetic gap axis of the transducer head defined by the flux deflecting sliver 18 is substantially aligned with the plane of the bottom surface 87 of the mounting slot 56. Consequently, any adjustment of the mounting bracket 32 toward and away from the record surface 12 results in a corresponding urging of the pad or shoe 28 toward and away from the record surface without any substantial longitudinal displacement of the flux gap axis.

A coil spring 89 is angularly disposed with one end projecting within a pocket 90 in the mounting bar 54 anchored therein by means of a pin 91, and the other end, projecting within an angularly disposed pocket 92 in the mounting bracket 32, normally pressing against the bottom surface 93 of the pocket 92. The normally compressed coil spring 89 being thus disposed in an angular relationship with the axis of the mounting bracket 32 urges the mounting bracket 32 away from the record surface 12 while at the same time forcing a face 94 of the body 80 of the mounting bracket 32 to be forcibly applied against a side reference surface 95 of the slot 56 in the mounting bar 54. This provides two references surfaces for both the mounting bracket and the mounting slot so that, if replacement of the mounting bracket-electromagnetic transducer head assembly is necessary, the reference surfaces of the slot 56 will automatically position the mounting bracket 32, thereby placing the transducer head flux gap directly over the appropriate magnetic track on the record surface 12.

The offset portion 88 of the mounting bracket affords a convenient support for a binding post or connector 44 for the terminal wires 26 of the electromagnetic transducer coil.

The transducer head spacing in relation to the record surface is finally adjusted, during dynamic conditions, in the following manner:

A removable block 100 is clamped on the top surface 102 of the mounting bar 54 by means of, for example, a thumb screw 104 having a threaded portion 106 passing through a hole 108 in the block 100 and engaging a threaded hole 110 in the mounting bar 54. The block 100 is provided with a threaded bore 112 disposed above the end face 114 of the mounting bracket 32 and in which is placed an adjusting tool 116 having a threaded portion 118 engaging the threaded bore 112. The adjusting tool 116 is further provided with an end face portion 120 adapted to engage the face 114 of the mounting bracket.

Turning the adjusting tool 116 in the appropriate direction, after the mounting screw 82 has been loosened, causes its end face portion 120 to engage the surface 114 of the mounting bracket 32 thereby linearly displacing the mounting bracket 32 slidably within the slot 56 of the mounting bar 54 in a direction which causes the bearing surface 29 of the transducer head pad or shoe 28 to be urged closer to the record surface 12 against the compressive force of the coil spring 89. Turning the adjusting tool 120 in the opposite direction allows the force of the spring 89 to urge the mounting bracket 32 away from the record surface 12. In this manner, every electromagnetic transducer head may be adjusted for uniform optimum signal levels according to the method set forth in relation to the description of the embodiment of the invention of FIGURES 1–3.

When the appropriate individual adjustment has been obtained, the mounting screw 82 is secured and the removable block 110 may be swung to the position shown in FIGURE 4 in dot and dash lines to effectuate adjustment of the next transducer head. It is obvious of course that removable blocks may be used that would enable adjusting of several transducer heads.

Having thus described the invention by way of structural examples incorporating the principle of the said invention in a manner enabling persons skilled in the art to practice the same, what is sought to be protected by Letters Patent is:

1. Apparatus for resiliently supporting at least one electromagnetic transducer head a predetermined distance away from a moving magnetizable record surface by utilizing the fluid bearing produced by the gas or air set in motion by the movement of said record surface, said apparatus comprising in combination:

said electromagnetic transducer head enclosed in a magnetic shield and having a magnetic gap disposed so as to confront the record surface with the axis of said magnetic gap substantially orthogonal to said record surface;

a molded shoe member having a bearing surface adapted to be supported by the fluid bearing, said shoe member at least partly encasing the electromagnetic transducer head with the ends of the pole pieces defining its magnetic gap disposed substantially flush with said bearing surface;

a pair of parallel flat resilient reed members disposed in spatial relationship one above the other along planes normally substantially perpendicular to the axis of the electromagnetic transducer head magnetic gap, each of said members having one end imbedded in the molded shoe member;

a fixed mounting bar provided with mounting cut-out slots disposed on one side thereof;

a generally F-shaped mounting bracket supporting the other end of the flat resilient reed members, said mounting bracket having a body portion adapted to be snugly disposed in one of the mounting slots of the fixed mounting bar so as to be adjustable by sliding only in a direction parallel to the axis of the electromagnetic transducer head magnetic gap and a flange portion disposed at right angle to the body portion so as to confront the side of the mounting bar farthest away from the record surface;

a mounting screw passing through an elongated hole in the mounting bracket and engaging a threaded hole in the mounting bar for clamping of said bracket upon said bar; and a coil spring disposed between the mounting bar and the flange portion of the mounting bracket for urging said mounting bracket and consequently the bearing surface of the shoe member in a direction away from the record surface in the event that the mounting screw becomes loose.

2. Apparatus according to claim 1 further including removable adjusting means comprising:

an adjusting tool having a threaded member passing through a hole in the flange portion of the mounting bracket and engaging a threaded bore in the mounting bar;

a shoulder portion on the adjusting tool adapted to engage the flange portion of the mounting bracket for linearly displacing said mounting bracket and consequently the bearing surface of the electromagnetic transducer head shoe member toward the record surface against the biasing action of the coil spring when the adjusting tool is rotated in one direction with the mounting screw loosely secured; and said coil spring urging the mounting bracket away from the record surface when the adjusting tool is rotated in an opposite direction.

3. Apparatus for resiliently supporting at least one electromagnetic transducer head a predetermined distance away from a moving magnetizable record surface by utilizing the fluid bearing produced by the gas or air set in motion by the movement of said record surface, said apparatus comprising in combination:

said electromagnetic transducer head having a magnetic gap disposed so as to confront the record surface with the axis of said magnetic gap substantially orthogonal to said record surface;

a shoe member having a bearing surface adapted to be supported by the fluid bearing, said shoe member supporting the electromagnetic transducer head with the ends of the pole pieces defining its magnetic gap disposed substantially flush with said bearing surface;

at least a pair of parallel flat resilient reed members disposed in spatial relationship one above the other along planes normally substantially perpendicular to the axis of the electromagnetic transducer head magnetic gap, each of said members having one end imbedded in the molded shoe member;

a fixed mounting bar;

a generally F-shaped mounting bracket supporting the other end of the flat resilient reed members, said mounting bracket having a body portion and a flange portion disposed at right angle to the body portion so as to confront the side of the mounting bar farthest away from the record surface;

means dependent from the mounting bar for maintaining the mounting bracket so as to allow said bracket to be adjustable by sliding only in a direction parallel to the axis of the electromagnetic transducer head magnetic gap;

fastening means for clamping of said bracket upon said mounting bar; and spring means disposed between the mounting bar and the flange portion of the mounting bracket for urging said mounting bracket and consequently the bearing surface of the shoe member in a direction away from the record surface in the event that the fastening means becomes loose.

4. Apparatus according to claim 3 further including removable adjusting means comprising:

an adjusting tool having a threaded member passing through a hole in the flange portion of the mounting bracket and engaging a threaded bore in the mounting bar;

a shoulder portion on the adjusting tool adapted to engage the flange portion of the mounting bracket for linearly dislacing said mounting bracket and consequently the bearing surface of the electromagnetic transducer head shoe member toward the record surface against the biasing action of the spring means when the adjusting tool is rotated in one direction with the fastening means loosely secured; and said spring means urging the mounting bracket way from the record surface when the adjusting tool is rotated in an opposite direction.

5. Apparatus for resiliently supporting at least one electromagnetic transducer head a predetermined distance away from a moving magnetizable record surface by utilizing the fluid bearing produced by the gas or air set in motion by the movement of said record surface, said apparatus comprising in combination:

said electromagnetic transducer head enclosed in a magnetic shield and having a magnetic gap disposed so as to confront the record surface with the axis of said magnetic gap substantially orthogonal to said record surface;

a molded shoe member having a bearing surface adapted to be supported by the fluid bearing, said shoe member at least partly encasing the electromagnetic transducer head with the ends of the pole pieces defining its magnetic gap disposed substantially flush with said bearing surface;

a pair of parallel flat resilient reed members disposed in spatial relationship one above the other along planes normally substantially perpendicular to the axis of the electromagnetic transducer head magnetic gap, each of said members having one end imbedded in the molded shoe member;

a fixed mounting bar provided with mounting cut-out slots disposed on one side thereof, each one of said slots having at least a side reference surface and a bottom reference surface;

a mounting bracket having an offset end portion supporting the other end of the flat resilient reed members and a body portion adapted to be disposed in one of the mounting slots of the fixed mounting bar so as to be adjustable by sliding only in a direction generally parallel to the axis of the electromagnetic transducer head magnetic gap, said body portion being provided with a first reference surface normally bearing upon the side reference surface in a slot in the mounting bar and a second reference surface normally bearing upon the bottom reference surface in said slot, said second reference surface being in a plane substantially passing through the axis of the electromagnetic head magnetic gap;

a mounting screw passing through an elongated hole in the body portion of the mounting bracket and engaging a threaded hole in the mounting bar for clamping of said bracket upon said bar; and a normally compressed coil spring angularly disposed between an anchor point in the mounting bar and the bottom surface of a pocket in the body portion of the mounting bracket for urging said mounting bracket and consequently the bearing surface of the shoe member in a direction away from the record surface in the event that the mounting screw becomes loose, and for, at the same time, urging the first reference surface on said body portion against the side reference surface in the slot in said mounting bar.

6. Apparatus according to claim 5 further including removable adjusting means comprising:

a removable block capable of being secured to the mounting bar and having a threaded bore disposed so as to confront the end face of the body portion of the mounting bracket;

an adjusting tool having a threaded portion passing through the threaded bore in the mounting bar and an end portion engaging the end face of the mounting bracket body portion for linearly displacing said mounting bracket and consequently the bearing surface of the electromagnetic transducer head shoe member toward the record surface against the biasing action of the coil spring when the adjusting tool is rotated in one direction with the mounting screw loosely secured; and said coil spring urging the mounting bracket away from the record surface when the adjusting tool is rotated in an opposite direction.

7. Apparatus for resiliently supporting at least one electromagnetic transducer head a predetermined distance away from a moving magnetizable record surface by utilizing the fluid bearing produced by the gas or air set in motion by the movement of said record surface, said apparatus comprising in combination:

said electromagnetic transducer head having a magnetic gap disposed so as to confront the record surface with the axis of said magnetic gap substantially orthogonal to said record surface;

a shoe member having a bearing surface adapted to be supported by the fluid bearing, said shoe member supporting the electromagnetic transducer head with the ends of the pole pieces defining its magnetic gap disposed substantially flush with said bearing surface;

at least a pair of parallel flat resilient reed members disposed in spatial relationship one above the other along planes normally substantially perpendicular to the axis of the electromagnetic transducer head magnetic gap, each of said members having one end imbedded in the molded shoe member;

a fixed mounting bar;

a mounting bracket having an offset end portion supporting the other end of the flat resilient reed members and a body portion;

means dependent from the mounting bar for maintaining the mounting bracket so as to allow said bracket to be adjustable by sliding only in a direction parallel to the axis of the electromagnetic transducer head magnetic gap;

fastening means for clamping of said bracket upon said bar; and spring means disposed between the mounting bar and the body portion of the mounting bracket for urging said mounting bracket and consequently the bearing surface of the shoe member in a direction away from the record surface in the event that the fastening means becomes loose, while at the same time maintaining at least a reference surface dependent from said bracket applied against a reference surface dependent from said bar for providing correct alignment of the electromagneic transducer head magnetic gap.

8. Apparatus according to claim 7 further including removable adjusting means comprising:

an adjusting tool having a threaded member passing through a threaded hole in a removable block fixed in relation to the mounting bar;

an end face portion on the adjusting tool adapted to engage the end face of the mounting bracket for linearly displacing said mounting bracket and consequently the bearing surface of the electromagnetic transducer head shoe member toward the record surface against the biasing action of the spring means when the adjusting tool is rotated in one direction with the fastening means loosely secured; and said coil spring urging the mounting bracket away from the record surface when the adjusting tool is rotated in an opposite direction.

9. Apparatus for resiliently supporting at least one electromagnetic transducer head a predetermined distance away from a moving magnetizable record surface by utilizing the fluid bearing produced by the movement of said record surface, said apparatus comprising in combination:

said electromagnetic transducer head having a magnetic gap adapted to confront the record surface;

a molded shoe member having a bearing surface adapted to be supported by the fluid bearing, said shoe member at least partly encasing the electromagnetic transducer head with its magnetic gap disposed substantially flush with said bearing surface;

a pair of parallel flat resilient reed members disposed in spatial relationship one above the other in planes normally substantially perpendicular to the axis of the electromagnetic transducer head magnetic gap, each of said members having one end fastened to the molded shoe member;

a fixed mounting bar provided with mounting slots;

a mounting bracket supporting the other end of the flat resilient reed members, said mounting bracket being adapted to be disposed in one of the mounting slots of the fixed mounting bar so as to be adjustable only in a direction parallel to the axis of the electromagnetic transducer head magnetic gap;

a fastening screw for clamping the mounting bracket upon the mounting bar; and a coil spring disposed between the mounting bracket and the mounting bar for urging said mounting bracket and consequently the bearing surface of the shoe member in a direction away from the record surface in the event of failure of the fastening screw.

10. Apparatus according to claim 9 further including removable adjusting means comprising:

a threaded member engaging a threaded bore dependent from the mounting bar;

a bearing surface integral with said threaded member and adapted to engage a surface of the mounting bracket to linearly displace said mounting bracket and consequently the bearing surface of the electromagnetic transducer head shoe member toward the record surface against the biasing action of the coil spring when the threaded member is rotated in one direction with the fastening screw loosely secured; and said coil spring urging the mounting bracket away from the record surface when the threaded member is rotated in an opposite direction.

(References on following page)

References Cited by the Examiner

UNITED STATES PATENTS

| | | | |
|---|---|---|---|
| 3,039,102 | 6/1962 | Fuller et al. | 179—100.2 |
| 3,055,987 | 9/1962 | Ricketts | 179—100.2 |
| 3,245,063 | 4/1966 | Cheney et al. | 340—174.1 |

BERNARD KONICK, *Primary Examiner.*

V. P. CANNEY, *Assistant Examiner.*